United States Patent
Zhan et al.

(10) Patent No.: US 11,934,063 B2
(45) Date of Patent: Mar. 19, 2024

(54) ADAPTIVE EXTERIOR DISPLAY

(71) Applicant: Apple Inc., Cupertino, CA (US)

(72) Inventors: Tao Zhan, Saratoga, CA (US); Yu P Sun, Yorba Linda, CA (US); Rong Liu, Sunnyvale, CA (US); Yong Seok Choi, Pleasanton, CA (US); Joshua A Spechler, Campbell, CA (US); Jun Qi, San Jose, CA (US); Victor H Yin, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/083,314

(22) Filed: Dec. 16, 2022

(65) Prior Publication Data

US 2023/0251518 A1 Aug. 10, 2023

Related U.S. Application Data

(60) Provisional application No. 63/307,315, filed on Feb. 7, 2022.

(51) Int. Cl.
*G02F 1/1335* (2006.01)
*G02F 1/133* (2006.01)
(Continued)

(52) U.S. Cl.
CPC .... *G02F 1/133504* (2013.01); *G02F 1/13312* (2021.01); *G02F 1/1334* (2013.01); *G02F 1/13718* (2013.01); *G02F 1/157* (2013.01)

(58) Field of Classification Search
CPC ........... G02F 1/133504; G02F 1/13312; G02F 1/1334; G02F 1/13718; G02F 1/157; G02F 1/133524; G02F 2203/62
See application file for complete search history.

(56) References Cited

U.S. PATENT DOCUMENTS 6,885,968 B2   4/2005   Breed et al.
7,852,462 B2   12/2010  Breed et al.
(Continued)

FOREIGN PATENT DOCUMENTS

CN   106461997 A   2/2017
CN   107250744 A   10/2017
(Continued)

OTHER PUBLICATIONS

Yuta Sugiura et al., Public/Private Interactive Wearable Projection Display, Proceedings of the 16th ACM SIGGRAPH International Conference on Virtual-Reality Continuum and its Applications in Industry, Dec. 2, 2018, pp. 1-6, Association for Computing Machinery, New York, NY, United States.

*Primary Examiner* — Donald L Raleigh
(74) *Attorney, Agent, or Firm* — Treyz Law Group, P.C.; Joseph F. Guihan (57) ABSTRACT

A system may have a display that includes a plurality of light sources such as light-emitting diodes. The display may be an exterior display that is routinely operated in daytime conditions where ambient light levels are very high. To increase contrast in an exterior display, the display may include a sunlight blocking element. A static sunlight blocking element may include a louver film with asymmetric light blocking portions. The system may include an ambient light sensor that is configured to determine ambient light levels. Based on the detected ambient light level, control circuitry in the system may adjust one or more adjustable components in the display. The display may include an adjustable diffuser that has at least two states with different haze levels. The display may include an adjustable tint layer that has at least two states with different transmission levels.

20 Claims, 11 Drawing Sheets

(51) Int. Cl.
   *G02F 1/1334*   (2006.01)
   *G02F 1/137*    (2006.01)
   *G02F 1/157*    (2006.01)

(56) References Cited

U.S. PATENT DOCUMENTS

| | | |
|---|---|---|
| 8,120,652 B2 | 2/2012 | Bechtel et al. |
| 8,300,304 B2 | 10/2012 | Gally et al. |
| 10,247,982 B2 | 4/2019 | Choi et al. |
| 10,288,935 B2 | 5/2019 | Choi et al. |
| 10,331,939 B2 | 6/2019 | He et al. |
| 10,464,476 B1 | 11/2019 | Mazuir et al. |
| 11,002,066 B2 | 5/2021 | Wilson et al. |
| 11,104,267 B1 | 8/2021 | Mazuir et al. |
| 2010/0002306 A1 | 1/2010 | Goto |
| 2011/0242449 A1* | 10/2011 | Chang .................. G02F 1/157 349/61 |
| 2016/0356943 A1 | 12/2016 | Choi et al. |
| 2017/0103712 A1* | 4/2017 | Koon .................. G09G 3/3406 |
| 2017/0160621 A1 | 6/2017 | Yamashita |
| 2018/0129798 A1 | 5/2018 | He et al. |
| 2020/0271833 A1* | 8/2020 | Kuramoto ............ G02B 5/0236 |
| 2020/0348790 A1* | 11/2020 | Vampola .............. G09G 3/3406 |
| 2020/0366884 A1 | 11/2020 | Ng et al. |
| 2021/0033904 A1* | 2/2021 | Gammons ............ H05B 47/105 |
| 2021/0080763 A1* | 3/2021 | Sulai .................... G02B 5/0289 |
| 2021/0296410 A1* | 9/2021 | Ren ..................... B60R 11/0235 |

FOREIGN PATENT DOCUMENTS

| | | |
|---|---|---|
| CN | 109471491 A | 3/2019 |
| CN | 110770815 A | 2/2020 |
| CN | 111247480 A | 6/2020 |
| WO | 2016195786 A1 | 12/2016 |
| WO | 2018204199 A1 | 11/2018 |

* cited by examiner

ADAPTIVE EXTERIOR DISPLAY

This application claims priority to U.S. provisional patent application No. 63/307,315, filed Feb. 7, 2022, which is hereby incorporated by reference herein in its entirety.

BACKGROUND

This relates generally to systems, and, more particularly, to systems with displays.

Electronic systems often include displays. For example, an electronic device may have an organic light-emitting diode (OLED) display based on organic light-emitting diode pixels or a liquid crystal display (LCD) based on liquid crystal display pixels.

In some systems, a display may routinely be exposed to ambient sunlight. If care is not taken, reflections of the sunlight off of the display will wash out the display content.

It is within this context that the embodiments herein arise.

SUMMARY

A system may have a display that includes a plurality of light sources such as light-emitting diodes. The display may be an exterior display that is routinely operated in daytime conditions where ambient light levels are very high (e.g., due to ambient sunlight). The exterior display may normally have a given orientation relative to the ground (e.g., perpendicular the ground). This results in sunlight striking the display from a known range of angles.

If care is not taken, bright ambient light may reduce contrast and wash out the display content. To preserve contrast in an exterior display, the display may include a sunlight blocking element. The sunlight blocking element may be static or dynamic (adjustable). A static sunlight blocking element may include a louver film with asymmetric light blocking portions. The display may include one or more additional adjustable components to optimize the display for real-time ambient lighting conditions.

The system may include an ambient light sensor that is configured to determine ambient light levels. Based on the detected ambient light level, control circuitry in the system may adjust one or more adjustable components in the display.

The display may include an adjustable diffuser that has at least two states with different haze levels. When detected ambient light levels are low, the adjustable diffuser may be placed in a state with high diffusion to mitigate screen door effect in the display. When detected ambient light levels are high, the adjustable diffuser may be placed in a state with low diffusion to increase contrast in the display.

The display may include an adjustable tint layer that has at least two states with different transmission levels. When detected ambient light levels are low, the adjustable tint layer may be placed in a state with high transmission to increase display efficiency. When detected ambient light levels are high, the adjustable tint layer may be placed in a state with low transmission to increase contrast in the display.

DETAILED DESCRIPTION

Figure 1:
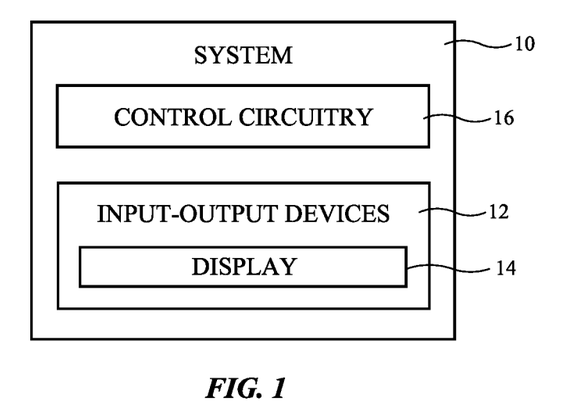
FIG. 1 is a schematic diagram of an illustrative system having a display in accordance with various embodiments.

An illustrative system of the type that may be provided with a display is shown in FIG. 1. System 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a display, a computer display that contains an embedded computer, a computer display that does not contain an embedded computer, a gaming device, a navigation device, an embedded system such as a system in which electronic equipment with a display is mounted in a kiosk or automobile, or other electronic equipment. System 10 may have the shape of a pair of eyeglasses (e.g., supporting frames), may form a housing having a helmet shape, or may have other configurations to help in mounting and securing the components of one or more displays on the head or near the eye of a user.

As shown in FIG. 1, system 10 may include control circuitry 16 for supporting the operation of system 10. Control circuitry 16 may include storage such as hard disk drive storage, nonvolatile memory (e.g., flash memory or other electrically-programmable-read-only memory configured to form a solid state drive), volatile memory (e.g., static or dynamic random-access memory), etc. Processing circuitry in control circuitry 16 may be used to control the operation of system 10. The processing circuitry may be based on one or more microprocessors, microcontrollers, digital signal processors, baseband processors, power management units, audio chips, application-specific integrated circuits, etc.

Input-output circuitry in system 10 such as input-output devices 12 may be used to allow data to be supplied to system 10 and to allow data to be provided from system 10 to external devices. The input-output devices 12 may include displays, light-emitting diodes and other light-emitting devices, haptic devices, speakers, and/or other devices for providing output. The input-output devices 12 may also include input devices such as buttons, sensors, and other devices for gathering user input, for gathering environmental measurements, and/or for gathering other information. The sensors may include ambient light sensors, touch sensors, force sensors, proximity sensors, optical sensors such as cameras operating at visible, infrared, and/or ultraviolet wavelengths (e.g., fisheye cameras, two-dimensional cameras, three-dimensional cameras, and/or other cameras), capacitive sensors, resistive sensors, ultrasonic sensors (e.g., ultrasonic distance sensors), microphones, radio-frequency sensors such as radar sensors, lidar (light detection and ranging) sensors, position sensors for monitoring location, orientation, and movement, speedometers, satellite positioning system sensors, and/or other sensors.

A user can control the operation of system 10 by supplying commands through input resources of input-output devices 12 and may receive status information and other output from system 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements. A touch sensor for display 14 may be formed from electrodes formed on a common display substrate with the display pixels of display 14 or may be formed from a separate touch sensor panel that overlaps the pixels of display 14. If desired, display 14 may be insensitive to touch (i.e., the touch sensor may be omitted). Display 14 in system 10 may be a head-up display that can be viewed without requiring users to look away from a typical viewpoint or may be a head-mounted display that is incorporated into a device that is worn on a user's head. If desired, display 14 may also be a holographic display used to display holograms.

Control circuitry 16 may be used to run software on device 10 such as operating system code and applications. During operation of device 10, the software running on control circuitry 16 may display images on display 14.

In some systems, display 14 may be an exterior display that is routinely operated in daytime conditions where ambient light levels are very high (e.g., due to ambient sunlight). Additionally, the exterior display may routinely have a given orientation relative to the ground (e.g., perpendicular the ground). This results in sunlight normally striking the display from a known range of angles. If care is not taken, bright ambient light may reduce contrast and wash out the display content. To preserve contrast in an exterior display, the display may include a sunlight blocking element. The sunlight blocking element may be static or dynamic (adjustable). The display may include one or more additional adjustable components to optimize the display for real-time ambient lighting conditions.

Figure 2:
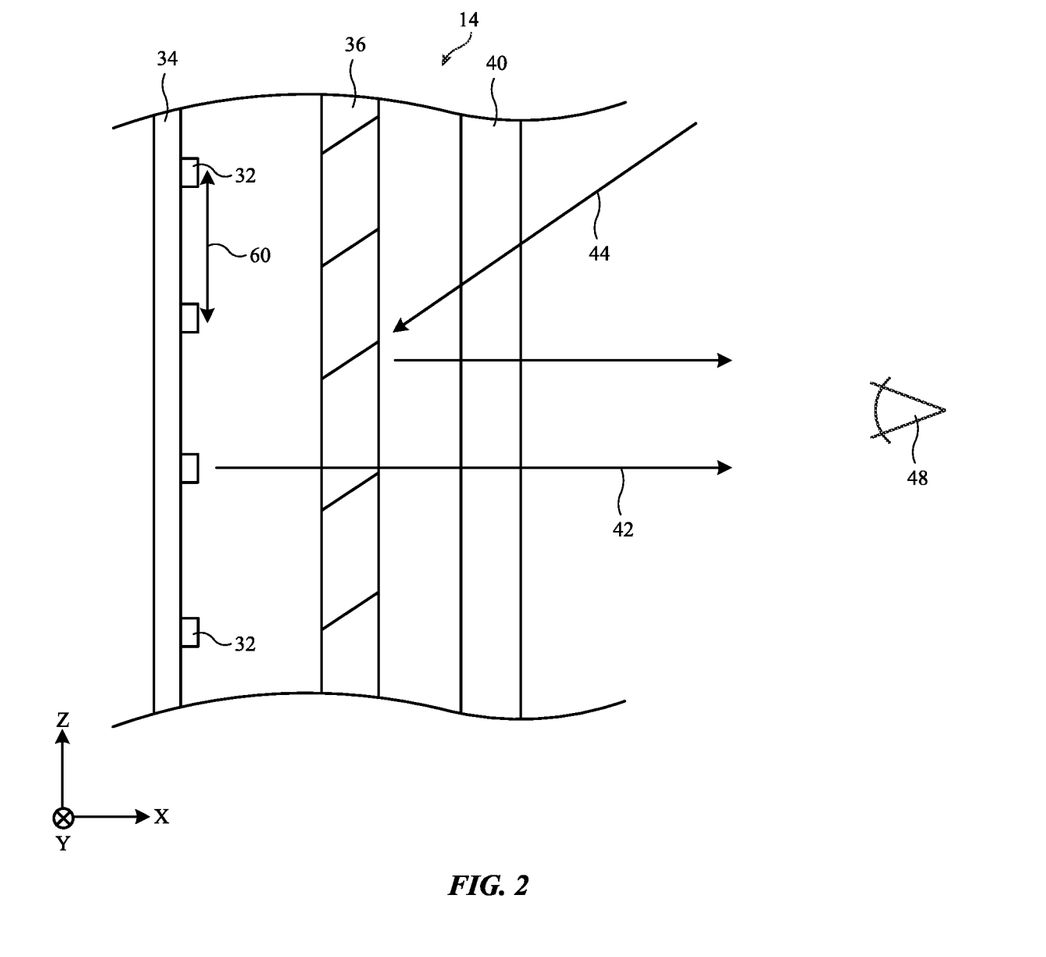
FIG. 2 is a cross-sectional side view of an illustrative display with a diffuser layer in accordance with various embodiments.

FIG. 2 is a cross-sectional side view of an illustrative display 14 showing how reflections of ambient light may decrease contrast in the display. As shown in FIG. 2, display 14 may include light sources 32 on a substrate 34. Light sources 32 may be light-emitting diodes (LEDs) such as organic light-emitting diodes (OLEDs) or inorganic LEDs, lasers, lamps, etc. Substrate 34 may be a printed circuit or other desired substrate.

Light sources 32 may include light sources of a single color (e.g., blue LEDs or white LEDs) or light sources of multiple colors (e.g., red, blue, and green LEDs). In arrangements in which light sources 32 include different color light sources, light color may be adjusted by selectively activating and deactivating light sources 32.

The light sources 32 emit light 42 that travels in the positive X-direction through one or more optical layers such as diffuser 36 (sometimes referred to as diffuser layer 36) and cover layer 40. Cover layer 40 (sometimes referred to as display cover layer 40, transparent cover layer 40, etc.) may be formed from a transparent material such as glass, plastic, sapphire, etc. The cover layer may have a transparency that is greater than 80%, greater than 90%, greater than 95%, greater than 99%, etc.

As shown in FIG. 2, light sources 32 may have a center-to-center spacing 60 (sometimes referred to as pitch 60). Pitch 60 may be greater than 1 millimeter, greater than 2 millimeters, greater than 3 millimeters, greater than 5 millimeters, between 2 millimeters and 3 millimeters, between 0.1 millimeter and 10 millimeters, less than 0.1 millimeter, less than 1 millimeter, less than 2 millimeters, less than 3 millimeters, less than 5 millimeters, etc.

Diffuser layer 36 may help mitigate a screen door effect (a black mesh that is viewable between light-emitting areas) when display 14 is on. The screen door effect may alternatively be referred to as grid mura (since a black grid is perceptible when viewing the display). If diffuser layer 36 was omitted, discrete light-emitting areas with an intervening black mesh may be perceptible to viewer 48. Diffuser layer diffuses the light 42 from the display such that a continuous light-emitting area is perceived by viewer 48 (mitigating the screen door effect).

Diffuser layer 36 therefore mitigates the screen door effect in display 14. However, diffuser layer 36 may undesirably cause ambient light to be reflected towards viewer 48. As shown in FIG. 2, ambient sunlight 44 may strike display 14. Diffuser layer 36 may have a high diffuse reflection and therefore reflects high amounts of the sunlight towards viewer 48. The reflected sunlight reduces contrast in display 14.

Figure 3:
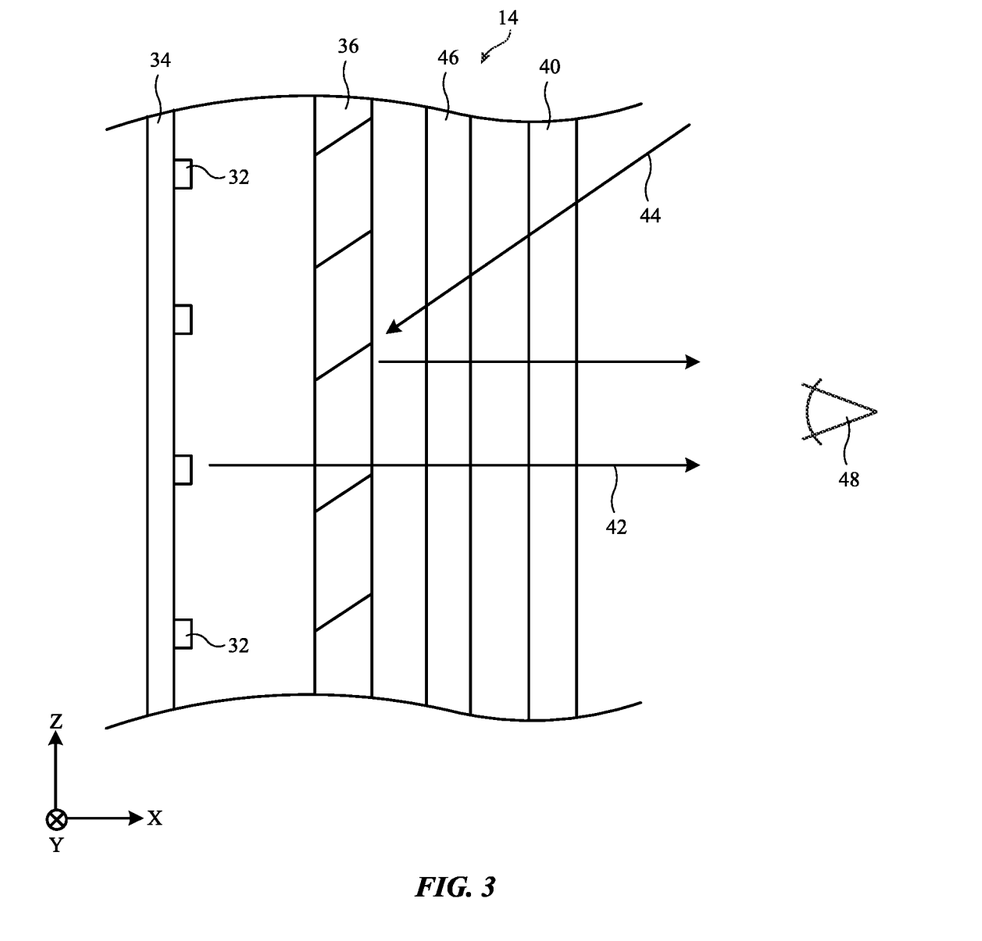
FIG. 3 is a cross-sectional side view of an illustrative display with a diffuser layer and a static sunlight rejection element in accordance with various embodiments.

To improve contrast in display 14 in the presence of ambient sunlight, an ambient light rejection element (sometimes referred to as a sunlight rejection element) may be included in the display. FIG. 3 is a cross-sectional side view of an illustrative display with a sunlight rejection element. As shown in FIG. 3, sunlight rejection element 46 may be interposed between diffuser layer 36 and cover layer 40. Ideally, the sunlight rejection element passes as much of display light 42 as possible while simultaneously preventing ambient light 44 (sometimes referred to as ambient sunlight) from being reflected towards viewer 48.

There are many possible ways to implement sunlight rejection element 46. In one possible arrangement, sunlight rejection element 46 in FIG. 3 may be a heavily tinted layer. The sunlight rejection element may transmit only 10% of incident light and absorbs the remaining 90% of incident light. Because ambient sunlight 44 has to pass through the sunlight rejection element twice to reach viewer 48, this type of sunlight rejection element reduces the brightness of sunlight reflections to 1% of the starting sunlight brightness. The display light 42, meanwhile, only passes through the sunlight rejection element once to reach viewer 48 and therefore has 10% of the starting brightness. The tinted layer therefore increases contrast in display 14. However, the display light transmission of 10% may result in a lower than desired display efficiency (because the light sources consume high amounts of power to achieve a target perceived brightness).

Figure 4A:
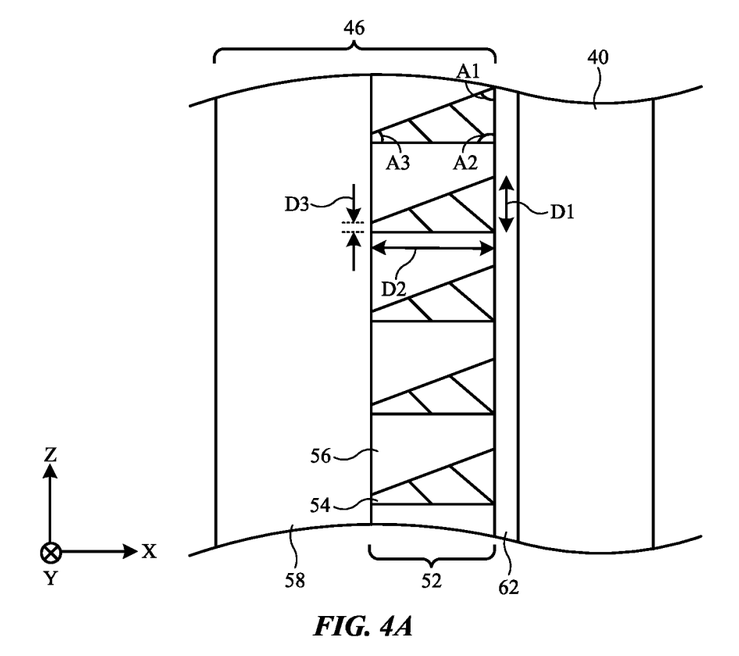
FIGS. 4A and 4B are cross-sectional side views of illustrative sunlight rejection elements that include louver films in accordance with various embodiments.
Figure 4B:
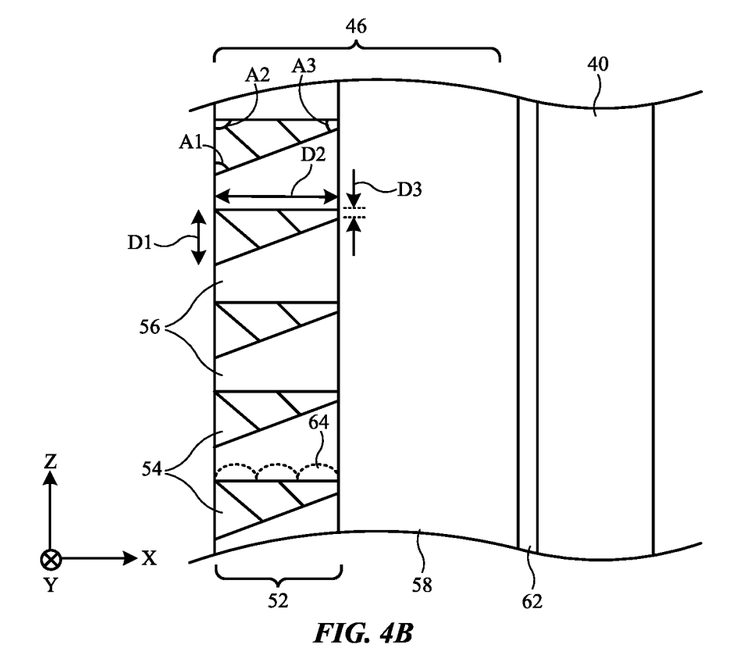

FIGS. 4A and 4B are cross-sectional side views of illustrative sunlight rejection elements that include a louver film. The louver film includes a plurality of light blocking (absorbing) elements at a regular pitch. The geometry of the light blocking elements is selected to control the output viewing angle of display 14 and/or improve blocking of ambient sunlight. As shown in the example of FIG. 4A, the sunlight rejection element 46 includes a louver film 52 with a plurality of light blocking elements 54. The light blocking elements 54 are interposed between transparent portions 56 of the louver film. The transparent portions may be formed from a transparent polymer or any other desired material. As one example, light blocking elements 54 (sometimes referred to as light blocking portions, light absorbing elements, etc.) may be formed from a black resin whereas the transparent portions 56 may be formed from a transparent resin.

Light blocking elements 54 may have a transmission of less than 30%, less than 20%, less than 10%, less than 5%, less than 3%, less than 1%, etc. Transparent portions 56 may have a transmission of greater than 70%, greater than 80%, greater than 90%, greater than 95%, greater than 97%, greater than 99%, etc.

The louver film may be laminated to a transparent substrate 58 formed from polyethylene terephthalate (PET) or another desired material. A layer of optically clear adhesive 62 may attach the sunlight rejection element 46 to transparent cover layer 40.

As shown in FIG. 4A, the light blocking elements 54 may be asymmetric if desired. The asymmetric arrangement for light blocking elements 54 may result in a desired viewing angle for display 14. As previously mentioned, display 14 may normally have the same orientation relative to the ground during operation. Viewers may therefore normally be present in a target viewing area. The viewing angle of display 14 may therefore be selected to include the target viewing area of the display.

In FIG. 4A, the light blocking elements have three sides of respective distances D1, D2, and D3. The sides are separated by respective angles A1, A2, and A3. The light blocking elements may extend parallel to the Y-axis (e.g., into and out of the page) across the width of display 14. In general, the magnitudes of D1-D3 and A1-A3 may be tuned to control the viewing angle of display 14 within the XZ plane.

D1 may be greater than 10 microns, greater than 20 microns, greater than 30 microns, greater than 100 microns, less than 5 microns, less than 20 microns, less than 30 microns, less than 100 microns, between 20 microns and 30 microns, etc. D2 may be greater than 25 microns, greater than 40 microns, greater than 60 microns, greater than 100 microns, less than 10 microns, less than 50 microns, less than 75 microns, less than 100 microns, between 40 microns and 60 microns, etc. D3 may be greater than 0.1 microns, greater than 1 micron, greater than 2 microns, greater than 5 microns, less than 10 microns, less than 5 microns, less than 3 microns, less than 1 micron, between 1 micron and 10 microns, etc. As one example, D1 is between 20 microns and 30 microns, D2 is between 40 microns and 60 microns, and D3 is between 1 micron and 10 microns. The center-to-center spacing (pitch) in the Z-direction for light blocking elements 54 may be greater than 25 microns, greater than 40 microns, greater than 60 microns, greater than 100 microns, less than 10 microns, less than 50 microns, less than 75 microns, less than 100 microns, between 40 microns and 60 microns, etc.

A1 may be greater than 30 degrees, greater than 45 degrees, greater than 60 degrees, greater than 75 degrees, less than 90 degrees, less than 75 degrees, less than 60 degrees, between 60 degrees and 70 degrees, etc. A2 may be greater than 45 degrees, greater than 75 degrees, greater than 85 degrees, greater than 90 degrees, less than 110 degrees, less than 90 degrees, less than 75 degrees, less than 60 degrees, between 80 degrees and 90 degrees, etc. A3 may be greater than 5 degrees, greater than 10 degrees, greater than 20 degrees, greater than 30 degrees, greater than 45 degrees, less than 90 degrees, less than 45 degrees, less than 30 degrees, less than 20 degrees, between 20 degrees and 30 degrees, etc. As one example, A1 is between 60 degrees and 70 degrees, A2 is between 80 degrees and 90 degrees, and A3 is between 20 degrees and 30 degrees.

Light blocking elements are therefore asymmetric relative to the XY-plane and the YZ-plane. As previously mentioned, the light blocking elements may extend parallel to the Y-axis (e.g., into and out of the page) across the width of display 14. Therefore, the light blocking elements may be symmetric relative to the XZ-plane.

During operation of display 14, the display will have full brightness in an expected viewing area of the display due to the geometry of the light blocking elements 54 (e.g., the light blocking elements only block display light outside of the target viewing angle). The viewing angle within the XZ-plane provided by light blocking elements 54 may be centered at an angle that is offset from the surface normal of display 14 (e.g., greater than 10 degrees from the surface normal, greater than 20 degrees from the surface normal, greater than 30 degrees from the surface normal, less than 45 degrees from the surface normal, between 10 degrees and 45 degrees from the surface normal, etc.). The light blocking elements will also block much of the ambient sunlight that reflects off of diffuser layer 36, thus preventing the ambient sunlight from washing out the display light.

The arrangement of louver film 52 in FIG. 4A is merely illustrative. In FIG. 4A, the louver film is interposed between substrate 58 and cover layer 40. In another possible embodiment, shown in FIG. 4B, the substrate 58 is interposed between the louver film 52 and cover layer 40. In FIG. 4B, the magnitudes of D1-D3 and A1-A3 are the same as discussed above in connection with FIG. 4A. In other words, the shape of the light blocking elements 54 in FIG. 4B is the same as in FIG. 4A. However, the orientation of the light blocking elements 54 is different in FIG. 4B than in FIG. 4A. In FIG. 4A, side D3 of the light blocking elements faces the light sources (e.g., faces the negative X-direction), side D2 of the light blocking elements faces the negative Z-direction, and side D1 of the light blocking elements faces the viewer (e.g., the positive X-direction). In FIG. 4B, side D1 of the light blocking elements faces the light sources (e.g., faces the negative X-direction), side D2 of the light blocking elements faces the positive Z-direction, and side D3 of the light blocking elements faces the viewer (e.g., the positive X-direction).

If care is not taken, the interface(s) between light blocking portions 54 and transparent portions 56 of louver film 52 may cause total internal reflection of display light that results in ghost image(s) perceived by viewer 48. To mitigate ghost images of this type, light blocking portions 54 and transparent portions 56 may be formed from materials having a similar refractive index. For example, a difference in refractive indices of light blocking portions 54 and transparent portions 56 may be less than 0.1, less than 0.05, less than 0.03, less than 0.01, etc.

Another option to mitigate ghost images caused by total internal reflection at the interface between light blocking portions 54 and transparent portions 56 is to include one or more optional light scattering features 64 at the interface between the light blocking portions 54 and transparent portions 56. The light scattering features 64 (sometimes referred to as light scattering elements 64) may be included at every interface or some but not all of the interfaces (e.g., half of the interfaces). The light scattering elements may be formed separately from light blocking portions 54 and transparent portions 56 (e.g., prisms or lenses included at the interface) or may be formed integrally with light blocking portions 54 and/or transparent portions 56 (e.g., light blocking portions 54 may be provided with textured surfaces at the interfaces to scatter light). The light scattering elements may be included in the louver films of FIG. 4A or FIG. 4B if desired.

Yet another option to mitigate ghost images caused by total internal reflection at the interface between light blocking portions 54 and transparent portions 56 is to minimize the distance between light sources 32 and louver film 52. The distance between light sources 32 and louver film 52 may be less than 10 millimeters, less than 8 millimeters, less than 6 millimeters, less than 4 millimeters, less than 2 millimeters, less than 1 millimeter, less than 0.1 millimeter, etc. One or more of the aforementioned techniques to mitigate ghost images may be used in a single display if desired.

The sunlight rejection elements with louver films of FIG. 4A or 4B may be used in the display of FIG. 3. If desired, diffuser layer 36 in FIG. 3 may be an asymmetric diffuser. The asymmetric diffuser may result in display light and/or reflections of ambient sunlight having a different viewing angle within the XY-plane than within the XZ-plane, as an example. In this way, the asymmetric diffuser may help tune the viewing angle of display 14 in both the horizontal direction (e.g., within the XY-plane) and the vertical direction (e.g., within the XZ-plane).

As previously mentioned, diffuser layer 36 in display 14 may help mitigate a screen door effect (a black mesh that is viewable between light-emitting areas) when display 14 is on. However, diffuser layer 36 may cause high reflections of ambient light, undesirably reducing contrast in display 14.

In high ambient light conditions, the screen door effect may be less noticeable to a viewer. Therefore, the diffusion of the display light is less important in high ambient light conditions (because the screen door effect does not cause visible artifacts in high ambient light conditions). The display may therefore include a switchable diffuser to optimize the display for real-time ambient light conditions.

In high ambient light conditions, the switchable diffuser may be switched to a first mode in which diffusion is low. In this state, the display has satisfactory performance with regards to the screen door effect (because the screen door effect is less noticeable in high ambient light conditions). Additionally, reflections of ambient light are mitigated, increasing the contrast of the display.

In low ambient light conditions, the switchable diffuser may be switched to a second mode in which diffusion is high. In this state, the switchable diffuser diffuses the display light to mitigate visible artifacts caused by the screen door effect. Additionally, because ambient light levels are low, the diffuser does not reflect significant amounts of ambient light and the contrast of the display remains sufficiently high.

Figure 5:
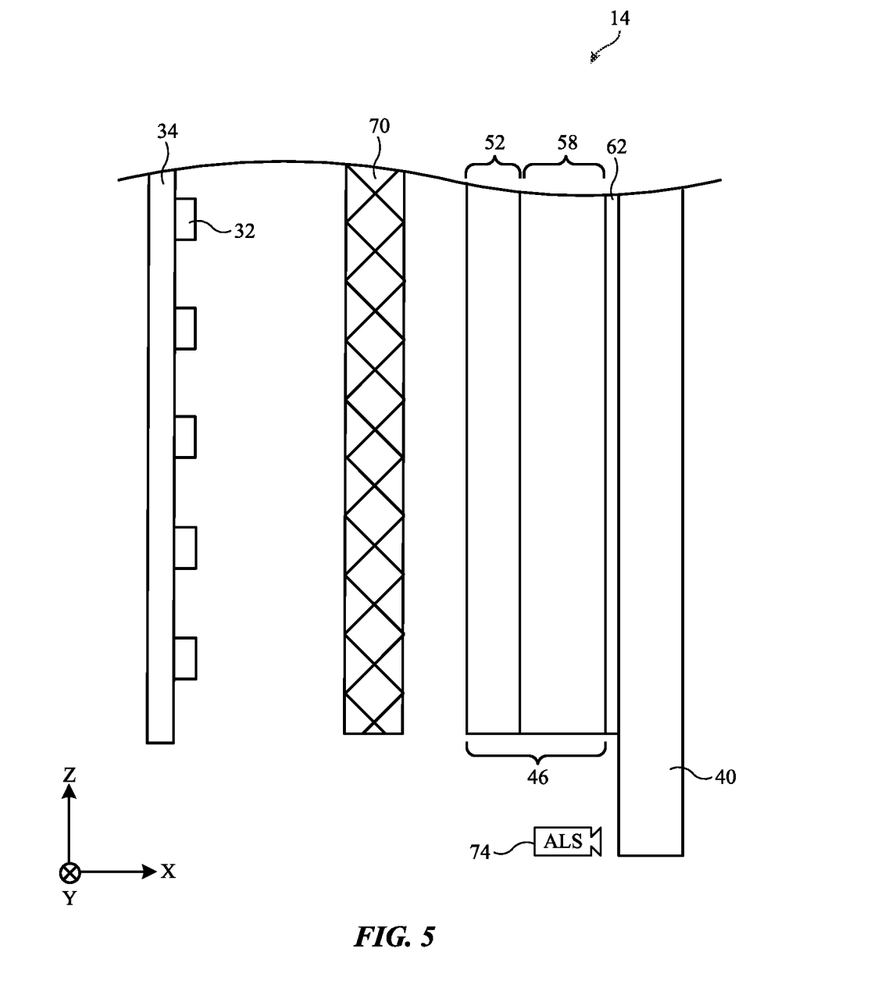
FIG. 5 is a cross-sectional side view of an illustrative display with an adjustable diffuser and a static sunlight rejection element in accordance with various embodiments.

FIG. 5 is a cross-sectional side view of an illustrative display with a switchable diffuser. As shown in FIG. 5, switchable diffuser 70 (sometimes referred to as adjustable diffuser 70) is interposed between sunlight rejection element 46 and light sources 32. In this example, sunlight rejection element 46 includes a louver film 52. FIG. 5 shows a sunlight rejection element of the arrangement shown in FIG. 4B. However, a sunlight rejection element of the arrangement shown in FIG. 4A may also be used in the display of FIG. 5.

As shown in FIG. 5, an ambient light sensor 74 may also be included in or adjacent to display 14. The ambient light sensor may include one or more photosensitive elements that measure the brightness of ambient light. Ambient light sensor 74 may sense ambient light levels that are used to determine the optimal state for switchable diffuser 70. In general, ambient light sensor 74 may be positioned at any desired location within system 10. Ambient light sensor 74 may be in close physical proximity to display 14 to determine the pertinent ambient lighting conditions for display 14. However, this need not be the case. Ambient light sensor 74 may be positioned in a different portion of system 10 that is not adjacent to display 14 if desired. In FIG. 5, ambient light sensor 74 senses light through cover layer 40 of display 14. This example is merely illustrative. Ambient light sensor may be covered by any desired layer(s) in system 10 or may be exposed to the exterior of system 10 without a covering layer.

Figure 6:
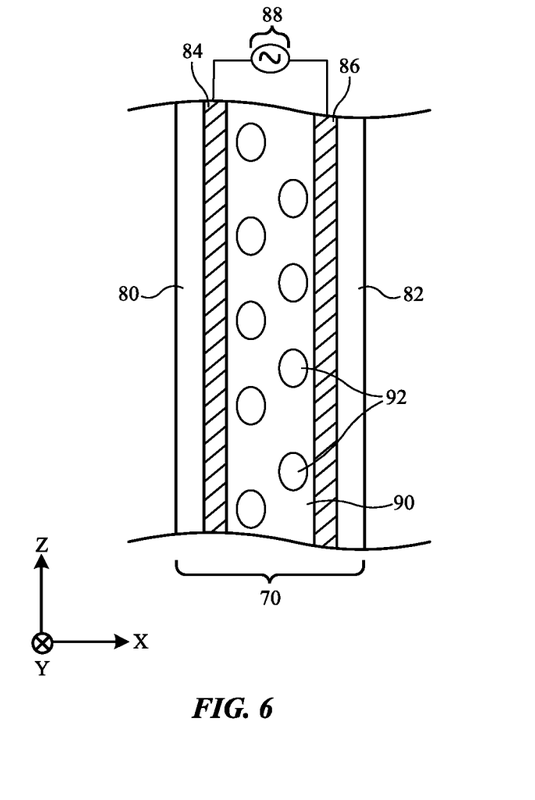
FIG. 6 is a cross-sectional side view of an illustrative adjustable diffuser such as the adjustable diffuser in FIG. 5 in accordance with various embodiments.

FIG. 6 is a cross-sectional side view of an illustrative switchable diffuser that may be used as the switchable diffuser in FIG. 5. Switchable diffuser 70 may have a layer of liquid crystal. As shown in FIG. 6, as one possible arrangement, liquid crystal droplets 92 may be dispersed in a host layer 90 (e.g., polymer) between transparent substrates 80 and 82. Substrates 80 and 82 may be formed from glass, plastic, or other transparent substrate material. Transparent conductive materials such as layers of indium tin oxide (ITO) 84 and 86 may be formed on each of substrates 80 and 82 to control the behavior of the liquid crystal droplets 92. In the example of FIG. 6, a voltage source 88 may be used to apply some amount of voltage onto layers 84 and 86 to control the orientation of the liquid crystal material in droplets 92. For example, switchable diffuser 70 may be placed in a first state when no voltage is applied and the liquid crystals have random orientation and are therefore diffusive. Switchable diffuser 70 may be placed in a second state when a nominal voltage level is applied and the liquid crystals are aligned and therefore clear. If desired, an intermediate voltage level that is between zero volts and the nominal high voltage level may be applied to fine tune the optical behavior of adjustable diffuser 70.

Adjustable diffuser 70 may be implemented using polymer dispersed liquid crystal (PDLC), polymer network liquid crystal (PNLC) material, polymer stabilized cholesteric texture (PSCT) material, smectic A (SmA) phase liquid crystal, a combination of these materials, and/or other suitable adjustable light diffusing materials.

Adjustable diffuser 70 may have a minimum haze in the second state and a maximum haze in the first state. Haze may be measured as the percentage of incident light scattered by more than 2.5 degrees through adjustable diffuser. The minimum haze of diffuser layer 70 (i.e., the haze in the second state) may be less than 20%, less than 10%, less than 5%, less than 3%, less than 1%, etc. The maximum haze of diffuser layer 70 (i.e., the haze in the first state) may be greater than 20%, greater than 30%, greater than 40%, greater than 50%, greater than 60%, etc. The ratio of the maximum haze to the minimum haze of adjustable diffuser 70 may be greater than 2, greater than 3, greater than 5, greater than 10, greater than 20, greater than 40, greater than 60, etc. As previously mentioned, the voltage source 88 may set the adjustable diffuser to have an intermediate haze between the minimum haze and the maximum haze if desired.

Figure 7:
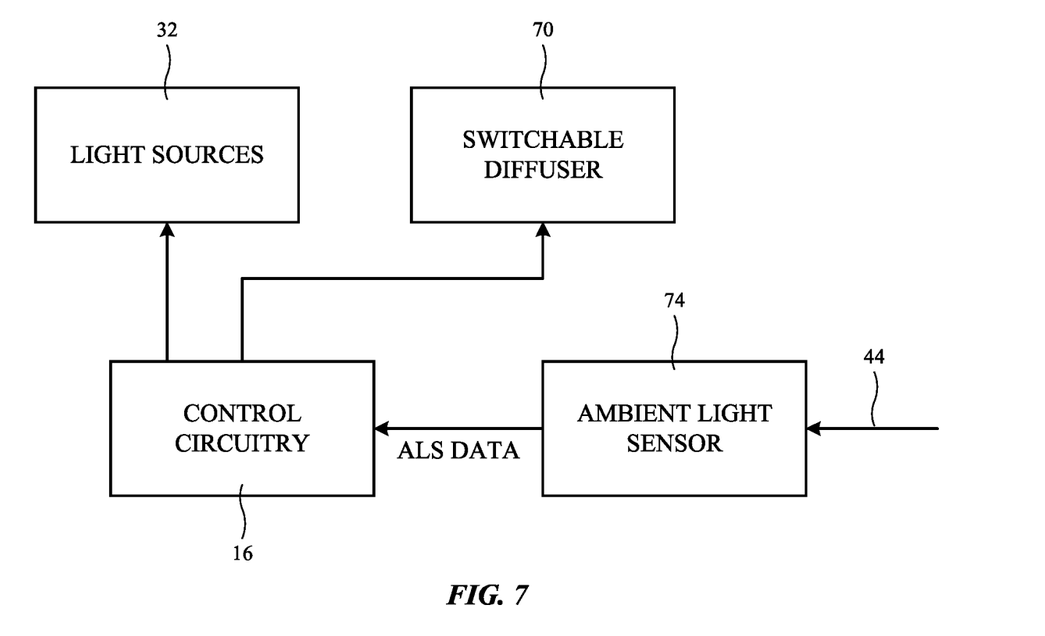
FIG. 7 is a schematic diagram of an illustrative display with an adjustable diffuser and a static sunlight rejection element such as the display in FIG. 5 in accordance with various embodiments.

FIG. 7 is a schematic diagram of the system of FIG. 5. As shown, ambient light sensor 74 may receive ambient light 44 and determine the brightness of ambient light 44. Data from the ambient light sensor is provided to control circuitry 16. Control circuitry 16 may control light sources 32 (e.g., to control the content on display 14). Additionally, control circuitry 16 may control switchable diffuser 70 based on the received ambient light sensor data. Control circuitry may control a voltage source 88 that adjusts the diffusive properties of switchable diffuser 70.

In general, control circuitry 16 will adjust switchable diffuser 70 to have a lower haze with increasing ambient light. This way, at low ambient light levels, the control circuitry 16 will control switchable diffuser 70 to have a high haze (and provide a large amount of diffusion). This will mitigate screen door effect in the display while maintaining satisfactory contrast. At high ambient light levels, the control circuitry 16 will control switchable diffuser 70 to have a low haze (and provide a small amount of diffusion). This will improve contrast for display 14 (by mitigating reflections of ambient sunlight) without resulting in visible screen door effect.

Control circuitry 16 may store one or more ambient light level thresholds if desired. The control circuitry 16 may set the switchable diffuser based on comparisons of the ambient light sensor data to the thresholds. For example, consider an example where one threshold is stored. The control circuitry may compare the ambient light level (from the sensor data) to the threshold. The control circuitry may set the adjustable diffuser to have a first haze if the ambient light level is below the threshold and may set the adjustable diffuser to have a second haze that is lower than the first haze if the ambient light level is above the threshold. Consider another example where two thresholds are stored. The control circuitry may compare the ambient light level (from the sensor data) to both thresholds. The control circuitry may set the adjustable diffuser to have a first haze if the ambient light level is below both thresholds, may set the adjustable diffuser to have a second haze that is lower than the first haze if the ambient light level is between the two thresholds, and may set the adjustable diffuser to have a third haze that is lower than the first and second haze if the ambient light level is above both thresholds. As another example, control circuitry 16 may store a linear or non-linear function that maps detected ambient light levels to corresponding haze levels. The control circuitry 16 uses the function to determine an appropriate haze for switchable diffuser 70 based on the real time ambient light level from the ambient light sensor.

Figure 8:
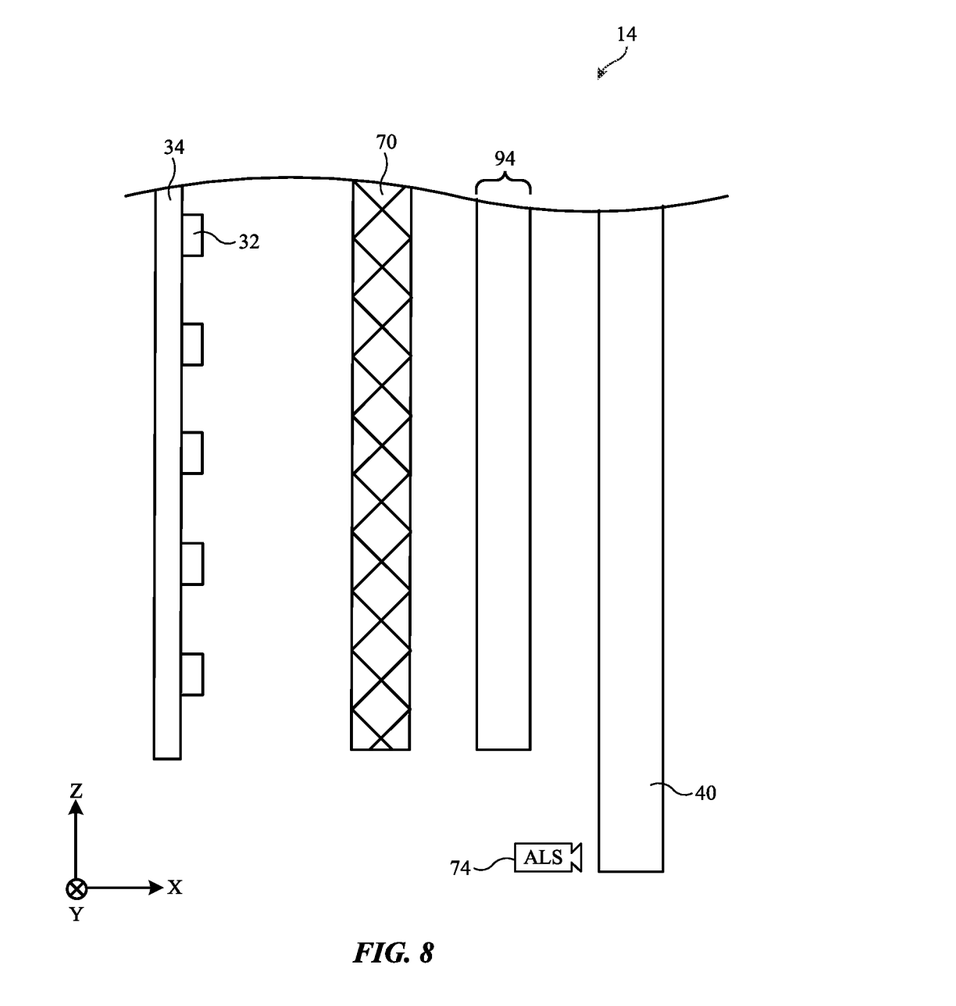
FIG. 8 is a cross-sectional side view of an illustrative display with an adjustable diffuser and an adjustable sunlight rejection element in accordance with various embodiments.

Display 14 may include an adjustable sunlight rejection element in addition to an adjustable diffuser. FIG. 8 is a cross-sectional side view of a display of this type. In FIG. 5, sunlight rejection element 46 is static (e.g., is not adjusted during operation of system 10). In FIG. 8, sunlight rejection element 94 is adjustable (e.g., is adjusted during operation of system 10).

In high ambient light conditions, the adjustable sunlight rejection element 94 may be switched to a first mode in which transmission is low. In this state, reflections of ambient sunlight are reduced and contrast of the display is improved. However, display light is also attenuated when the adjustable sunlight rejection element 94 has a low transmission, thus reducing the efficiency of the display.

In low ambient light conditions, the adjustable sunlight rejection element 94 may be switched to a second mode in which transmission is high. In this state, efficiency of the display is improved because display light is not attenuated. Because ambient light levels are low, the high transmission of the adjustable sunlight rejection element 94 does not result in excessive ambient light reflections.

Figure 9:
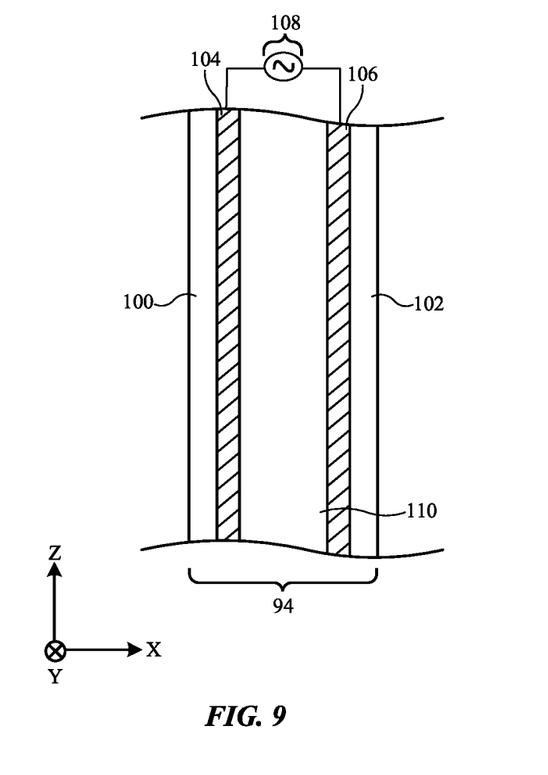
FIG. 9 is a cross-sectional side view of an illustrative adjustable sunlight rejection element such as the adjustable sunlight rejection element in FIG. 8 in accordance with various embodiments.

Adjustable sunlight rejection element 94 (sometimes referred to as an adjustable tint layer, electrically adjustable light modulator, adjustable ambient light rejection element, or electrically adjustable light modulator layer) may be formed from an organic or inorganic electrochromic light modulator layer or a guest-host liquid crystal light modulator layer. FIG. 9 is a cross-sectional side view of an illustrative adjustable tint layer. Adjustable tint layer 94 may have a layer of electrically adjustable tint material 110. The adjustable tint material 110 may include an electrochromic (EC) material (e.g., organic electrochromic material or inorganic electrochromic material). As another example, the adjustable tint material may include a guest-host liquid crystal layer. As shown in FIG. 9, tint material 110 is interposed between transparent substrates 100 and 102. Substrates 100 and 102 may be formed from glass, plastic, or other transparent substrate material. Transparent conductive materials (electrodes) such as layers of indium tin oxide (ITO) 104 and 106 may be formed on each of substrates 100 and 102 to control the behavior of tint material 110. In the example of FIG. 9, a voltage source 108 may be used to apply some amount of voltage onto layers 104 and 106 to control the tint material 110.

Control circuitry 16 may adjust voltage source 108 to change the electric field applied by the electrodes to the layer of tint material, thereby adjusting the amount of light transmission exhibited by the layer of tint material. In an illustrative configuration, the layer of tint material may exhibit a variable amount of light transmission ranging continuously between a minimum level of TMIN and a maximum level of TMAX. The value of TMIN may be 5%, 10%, 15%, 20%, 2-15%, 3-25%, 5-40%, 10-30%, 10-25%, at least 3%, at least 6%, at least 15%, at least 20%, less than 35%, less than 25%, less than 15%, or other desired minimum level. The value of TMAX may be at least 50%, at least 60%, 60-99%, 40-99.9%, 80-99%, 70-99%, 80-97%, at least 70%, at least 80%, at least 85%, at least 90%, at least 95%, less than 99.99%, less than 99%, or other desired maximum level. The voltage source 108 may set the adjustable tint layer to have an intermediate transmission between the minimum transmission and the maximum transmission if desired.

Figure 10:
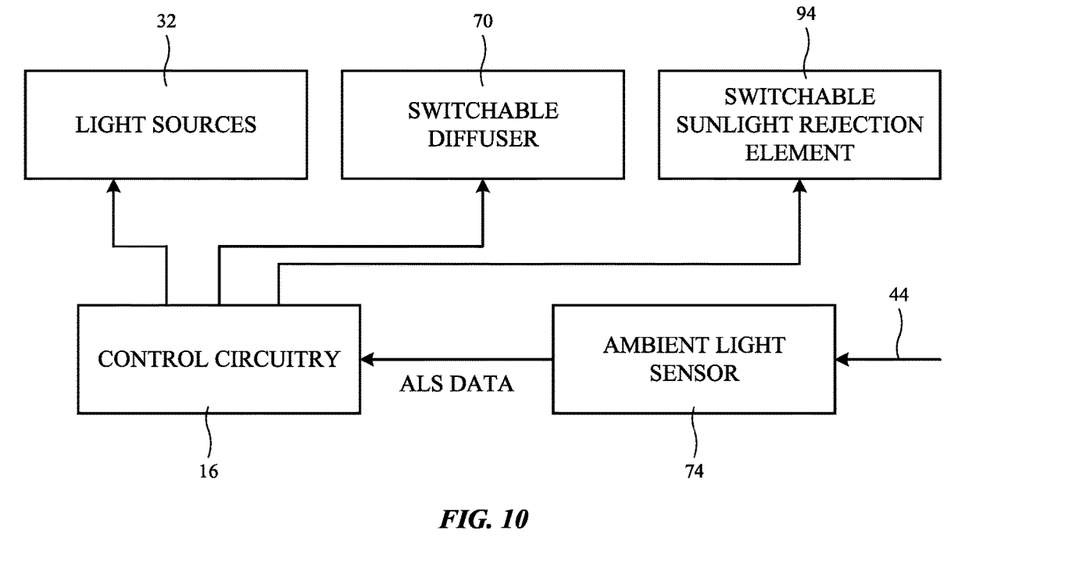
FIG. 10 is a schematic diagram of an illustrative display with an adjustable diffuser and an adjustable sunlight rejection element such as the display in FIG. 8 in accordance with various embodiments.

FIG. 10 is a schematic diagram of the system of FIG. 8. As shown, ambient light sensor 74 may receive ambient light 44 and determine the brightness of ambient light 44. Data from the ambient light sensor is provided to control circuitry 16. Control circuitry 16 may control light sources 32 (e.g., to control the content on display 14). Additionally, control circuitry 16 may control switchable diffuser 70 and switchable sunlight rejection element 94 based on the received ambient light sensor data. Control circuitry may control a voltage source 88 that adjusts the diffusive properties of switchable diffuser 70 and may control a voltage source 108 that adjusts the transmission properties of adjustable tint layer 94.

As previously described in connection with FIGS. 5-7, control circuitry 16 may adjust switchable diffuser 70 to have a lower haze with increasing ambient light. Similarly, control circuitry 16 may adjust switchable sunlight rejection element 94 to have a lower transmission with increasing ambient light. This way, at low ambient light levels, the control circuitry 16 will control adjustable tint layer 94 to have a high transmission. This will improve display efficiency while maintaining satisfactory contrast. At high ambient light levels, the control circuitry 16 will control adjustable tint layer 94 to have a low transmission. This will improve contrast for display 14.

Control circuitry 16 may store one or more ambient light level thresholds if desired. The control circuitry 16 may set the adjustable tint layer based on comparisons of the ambient light sensor data to the thresholds. For example, consider an example where one threshold is stored. The control circuitry may compare the ambient light level (from the sensor data) to the threshold. The control circuitry may set the adjustable tint layer to have a first transmission if the ambient light level is below the threshold and may set the adjustable tint layer to have a second transmission that is lower than the first transmission if the ambient light level is above the threshold. Consider another example where two thresholds are stored. The control circuitry may compare the ambient light level (from the sensor data) to both thresholds. The control circuitry may set the adjustable tint layer to have a first transmission if the ambient light level is below both thresholds, may set the adjustable tint layer to have a second transmission that is lower than the first transmission if the ambient light level is between the two thresholds, and may set the adjustable tint layer to have a third transmission that is lower than the first and second transmission levels if the ambient light level is above both thresholds. As another example, control circuitry 16 may store a linear or non-linear function that maps detected ambient light levels to corresponding transmission levels. The control circuitry 16 uses the function to determine an appropriate transmission for adjustable tint layer 94 based on the real time ambient light level from the ambient light sensor.

The example in FIGS. 8-10 of including an adjustable diffuser and an adjustable sunlight rejection element in display 14 is merely illustrative. If desired, the display may include a static sunlight rejection element and an adjustable diffuser (e.g., as shown in FIGS. 5-7), the display may include a static diffuser and an adjustable sunlight rejection element, or the display may include an adjustable sunlight rejection element and no additional diffuser.

Figure 11:
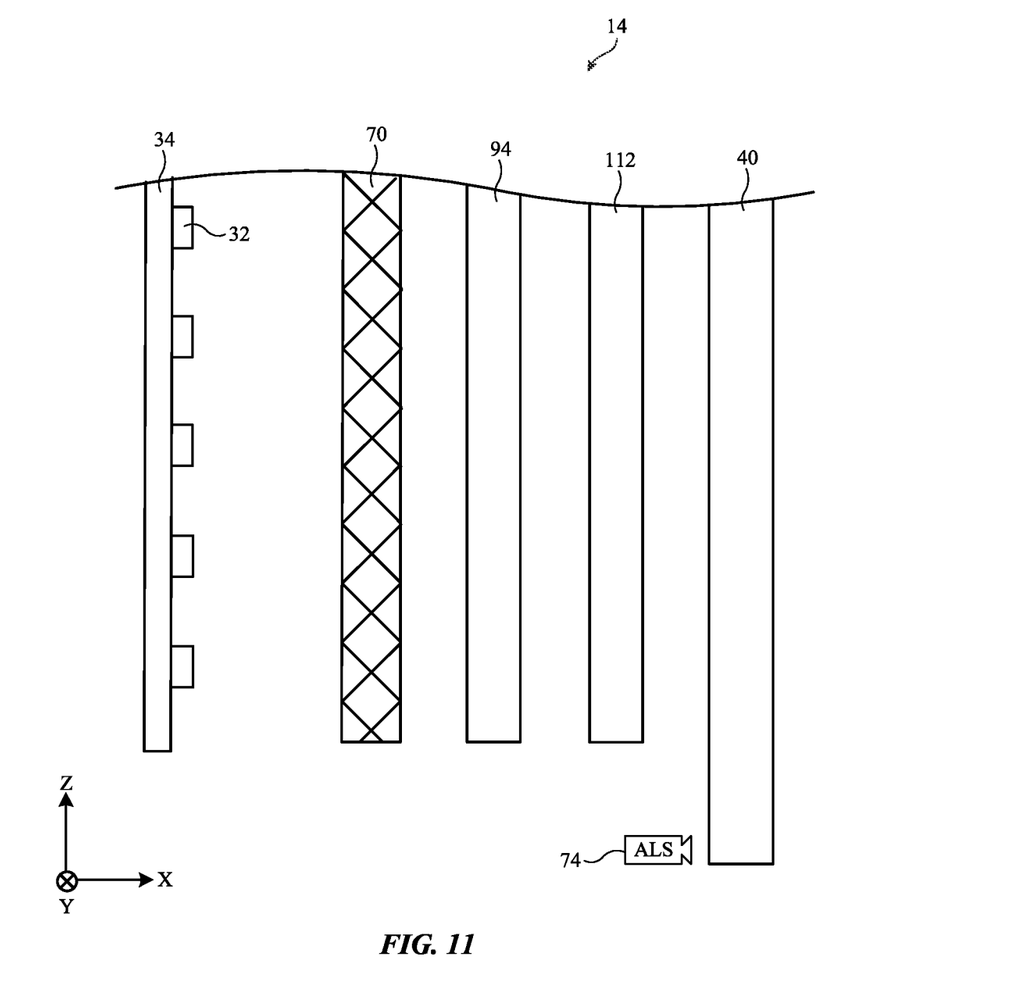
FIG. 11 is a schematic diagram of an illustrative display with an adjustable layer between a sunlight rejection element and a cover layer in accordance with various embodiments.

If desired, display 14 may include an additional adjustable layer between the sunlight rejection element and the cover layer. FIG. 11 is a cross-sectional side view of an illustrative display with an adjustable layer 112 between sunlight rejection element 94 and cover layer 40. Adjustable layer 112 may be used to provide display 14 with a desired aesthetic appearance when display 14 is off. In other words, the adjustable layer 112 may be switchable between two states. In the first state (e.g., when no voltage is applied to the adjustable layer), the adjustable layer may have a white appearance. The adjustable layer therefore has a white appearance when the display is off (and therefore no voltage is applied to the adjustable layer). In a second state (e.g., when voltage is applied to the adjustable layer), the adjustable layer may be clear. The adjustable layer may be placed in the second state when the display is on. Ideally, the adjustable layer has a low haze (e.g., less than 20%, less than 10%, less than 5%, less than 3%, less than 1%, etc.) in the second state to prevent impacting the underlying display optics when the display is on. Adjustable layer 112 may have any desired appearance (color) in the first state (when the display is off) to control the aesthetic appearance of display 14 when display 14 is off. For example, adjustable layer 112 may be white, gray, black, or any another desired color in the first state.

Adjustable layer 112 may be formed from an adjustable diffuser (e.g., using any of the techniques described in connection with FIGS. 5-7), from an adjustable tint layer (e.g., using any of the techniques described in connection with FIGS. 8-10), or from adjustable components of other types. In FIG. 11, the adjustable layer 112 is included in a display that also includes an adjustable diffuser 70 and an adjustable tint layer 94. This example is merely illustrative. If desired, adjustable layer 112 may be included in a display that includes a static diffuser (e.g., diffuser 36 in FIG. 3) and/or a static sunlight rejection element (e.g., sunlight rejection element 46 in FIG. 3). Adjustable layer 112 may be controlled by control circuitry 16.

Control circuitry 16 (which may adjust one or more of adjustable diffuser 70, adjustable sunlight rejection element 94, and adjustable layer 112) may include hard disk drive storage, nonvolatile memory (e.g., flash memory or other electrically-programmable-read-only memory configured to form a solid state drive), volatile memory (e.g., static or dynamic random-access memory), one or more microprocessors, one or more microcontrollers, one or more digital signal processors, one or more baseband processors, one or more power management units, one or more audio chips, one or more application-specific integrated circuits, and/or other desired components.

The foregoing is merely illustrative and various modifications can be made by those skilled in the art without departing from the scope and spirit of the described embodiments. The foregoing embodiments may be implemented individually or in any combination.

What is claimed is:

1. A display comprising:
a plurality of light sources;
an adjustable diffuser that is formed over the plurality of light sources;
a transparent cover layer, wherein the adjustable diffuser is interposed between the plurality of light sources and the transparent cover layer;
a louver film that is interposed between the adjustable diffuser and the transparent cover layer; and
control circuitry configured to adjust the adjustable diffuser based on ambient light sensor data received from an ambient light sensor.

2. The display defined in claim 1, wherein the control circuitry is configured to adjust the adjustable diffuser to have a first haze when an ambient light level has a first magnitude, wherein the control circuitry is configured to adjust the adjustable diffuser to have a second haze when the ambient light level has a second magnitude, wherein the second magnitude is greater than the first magnitude, and wherein the second haze is less than the first haze.

3. The display defined in claim 1, wherein the control circuitry is configured to adjust the adjustable diffuser to be more diffusive at a first ambient light level than at a second, higher ambient light level.

4. The display defined in claim 1, wherein the adjustable diffuser comprises a polymer stabilized cholesteric texture material.

5. The display defined in claim 1, wherein the adjustable diffuser comprises a polymer dispersed liquid crystal material.

6. The display defined in claim 1, wherein the louver film has alternating light blocking portions and transparent portions and wherein each one of the light blocking portions is asymmetric.

7. The display defined in claim 1, further comprising:
an adjustable tint layer that is interposed between the adjustable diffuser and the transparent cover layer.

8. The display defined in claim 7, wherein the control circuitry is configured to:
when an ambient light level has a first magnitude, adjust the adjustable diffuser to have a first haze and adjust the adjustable tint layer to have a first transmission; and
when the ambient light level has a second magnitude, adjust the adjustable diffuser to have a second haze and adjust the adjustable tint layer to have a second transmission, wherein the second magnitude is greater than the first magnitude, wherein the second haze is less than the first haze, and wherein the second transmission is less than the first transmission.

9. The display defined in claim 1, further comprising:
an additional adjustable layer that is interposed between the louver film and the transparent cover layer.

10. The display defined in claim 9, wherein the additional adjustable layer is an additional adjustable diffuser.

11. The display defined in claim 9, wherein the additional adjustable layer is an adjustable electrochromic layer.

12. A system comprising:
an ambient light sensor configured to generate ambient light sensor data; and
a display, wherein the display comprises:
light sources;
a diffuser that receives light from the light sources;
an adjustable tint layer, wherein the diffuser is interposed between the light sources and the adjustable tint layer; and
control circuitry configured to adjust the adjustable tint layer based on the ambient light sensor data.

13. The system defined in claim 12, wherein the control circuitry is configured to:
when an ambient light level has a first magnitude, adjust the adjustable tint layer to have a first transmission; and
when the ambient light level has a second magnitude, adjust the adjustable tint layer to have a second transmission, wherein the second magnitude is greater than the first magnitude and wherein the second transmission is less than the first transmission.

14. The system defined in claim 12, wherein the adjustable tint layer comprises an electrochromic material.

15. The system defined in claim 12, wherein the diffuser is an adjustable diffuser and wherein the control circuitry is configured to adjust the adjustable diffuser based on the ambient light sensor data.

16. A display comprising:
a plurality of light sources;
a diffuser that receives light from the plurality of light sources; and
a louver film, wherein the diffuser is interposed between the plurality of light sources and the louver film, wherein the louver film has alternating light blocking portions and transparent portions, and wherein each one of the light blocking portions is asymmetric.

17. The display defined in claim 16, wherein a difference between a first index of refraction of the light blocking portions and a second index of refraction of the transparent portions is less than 0.05.

18. The display defined in claim 16, wherein each light blocking portion has first, second, and third sides, wherein the first and second sides are separated by a first angle, wherein the second and third sides are separated by a second angle, wherein the first angle is between sixty degrees and seventy degrees and wherein the second angle is between eighty degrees and ninety degrees.

19. The electronic device defined in claim 12, wherein the display further comprises:
a transparent cover layer; and
a louver film, wherein the louver film is interposed between the plurality of light sources and the transparent cover layer.

20. The electronic device defined in claim 12, wherein the display further comprises:
an additional adjustable layer, wherein the control circuitry is configured to adjust the additional adjustable layer based on the ambient light sensor data.

* * * * *